(12) United States Patent
Chauvet et al.

(10) Patent No.: US 9,104,951 B2
(45) Date of Patent: Aug. 11, 2015

(54) MAN/MACHINE DIALOGUE SYSTEM

(75) Inventors: Francis Chauvet, Mouthiers (FR); Dominique Benni, Mornac (FR); Alain Tardivon, Gourville (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 518 days.

(21) Appl. No.: 13/511,066

(22) PCT Filed: Dec. 10, 2010

(86) PCT No.: PCT/EP2010/069415
§ 371 (c)(1),
(2), (4) Date: May 21, 2012

(87) PCT Pub. No.: WO2011/073108
PCT Pub. Date: Jun. 23, 2011

(65) Prior Publication Data
US 2012/0280800 A1    Nov. 8, 2012

(30) Foreign Application Priority Data
Dec. 18, 2009   (FR) ..................................... 09 59172

(51) Int. Cl.
*G06K 19/00* (2006.01)
*G06K 19/077* (2006.01)
*G06K 19/07* (2006.01)

(52) U.S. Cl.
CPC ...... *G06K 19/07749* (2013.01); *G06K 19/0716* (2013.01); *G06K 19/0723* (2013.01)

(58) Field of Classification Search
CPC .................. G06K 19/0716; G06K 19/07749; G06K 19/0723; G06K 3/0202; G06K 2212/178

USPC ............................ 340/10, 1, 10.5; 341/20, 22
See application file for complete search history.

(56) References Cited

U.S. PATENT DOCUMENTS

| | | | | |
|---|---|---|---|---|
| 5,579,002 A | * | 11/1996 | Iggulden et al. | 341/23 |
| 6,445,585 B1 | | 9/2002 | Walker | |
| 2004/0056781 A1 | * | 3/2004 | Rix et al. | 341/20 |
| 2004/0145453 A1 | * | 7/2004 | Tuttle | 340/10.1 |
| 2007/0109101 A1 | * | 5/2007 | Colby | 340/10.4 |
| 2008/0007408 A1 | | 1/2008 | Hwang et al. | |
| 2009/0167495 A1 | | 7/2009 | Smith et al. | |
| 2010/0171586 A1 | | 7/2010 | Park et al. | |

FOREIGN PATENT DOCUMENTS

WO    2008 038896    4/2008

OTHER PUBLICATIONS

International Search Report Issued Mar. 14, 2011 in PCT/EP10/69415 Filed Dec. 10, 2010.

* cited by examiner

*Primary Examiner* — Edwin Holloway, III
(74) *Attorney, Agent, or Firm* — Oblon, McClelland, Maier & Neustadt, L.L.P.

(57) ABSTRACT

A man/machine dialogue system including: an RFID read/write station including a data processor; an antenna that is magnetically connected or coupled with the read/write station; and a man/machine dialogue member including a man/machine dialogue interface and an electronic tag. The electronic tag includes an internal memory and a processor and is positioned so as to be supplied with power, via magnetic coupling, by the read/write station and so as to be in contactless communication, via magnetic coupling, with the read/write station.

13 Claims, 4 Drawing Sheets

Figure 1:
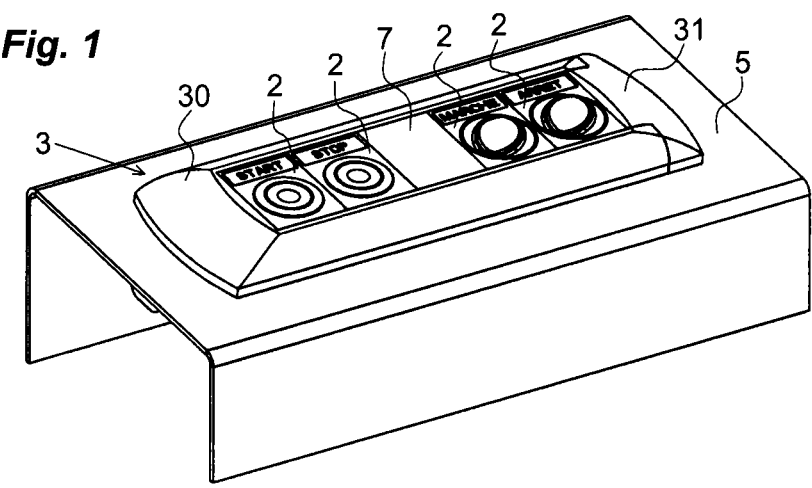

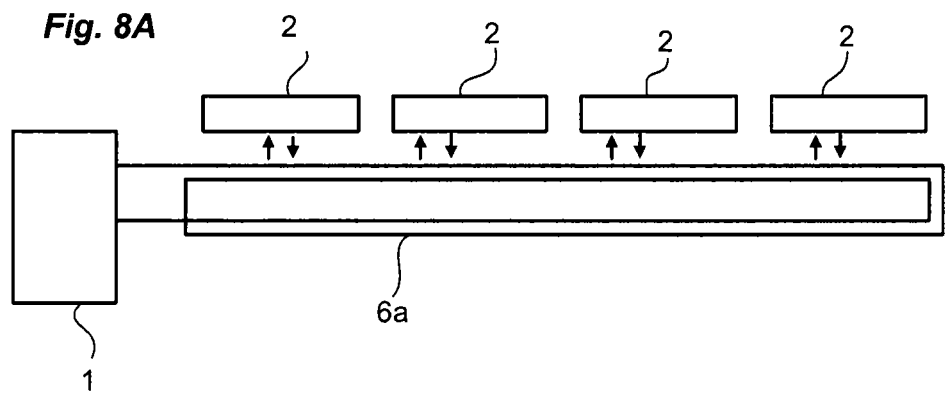
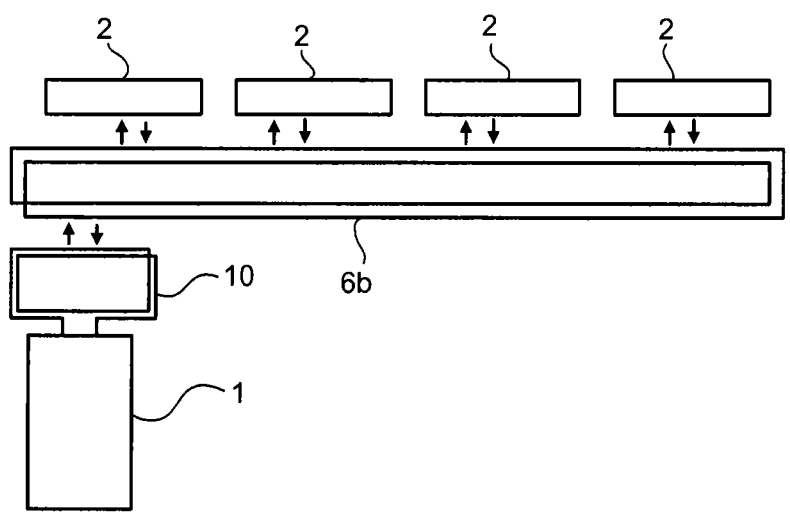

MAN/MACHINE DIALOGUE SYSTEM

The present invention relates to a human-machine dialog system. The invention relates more precisely to a human-machine dialog system which operates via magnetic coupling between an RFID read/write station and at least one human-machine dialog device.

The present invention thus uses the principle of radio frequency identification, also called RFID (Radio Frequency Identification), which enables an RFID read/write station (also called an RFID station or RFID reader) to exchange data with one or more RFID electronic tags (also called a transponder, tag or smart label) when they are placed near the RFID station in an area hereafter called the station dialog area.

In a known manner, an RFID read/write station has an antenna formed by an oscillating circuit in which a magnetic field can be created or captured that enables wireless communication via magnetic coupling (also called inductive coupling) with any oscillating circuit placed in a station dialog area, for example, with the antenna of an RFID electronic tag. Generally, binary data are exchanged between a station and a tag by amplitude and/or phase modulation of the magnetic signal's carrier frequency.

An RFID electronic tag is thus able to receive a radio signal and send back a different signal in response containing relevant information. It has a memory for storing various identification, recognition and/or process information. Some tags only allow a reading of previously stored data when a station is located nearby, but others also allow data to be written (write-once or multiple writing) and stored in the tag.

Moreover, in the case of a so-called passive tag, the electromagnetic signal (carrier) created by the antenna of the RFID station is also used to electrically power the tag when it is in the station dialog area. The energy captured by the tag antenna is actually converted into electrical energy that powers the internal circuitry (memory, processing unit, etc.) of this tag. Being powered with the energy produced by the electromagnetic field of the station, the tag therefore has the advantage of not needing any internal power supply such as a cell or a battery.

A human-machine dialog system is known from the document U.S. Pat. No. 6,285,295, comprising a keyboard and an RFID station. The keyboard comprises a plurality of keys, each key being associated with a switch and an RFID type passive electronic tag comprising processing means and an internal memory. The tags associated with each key on the keyboard are connected in parallel to a common antenna. The internal memory of each tag stores a unique identifier. Pressing a key on the keyboard causes the closure of the corresponding switch and the connection of the tag to the common antenna. Through the intermediary of this antenna, the tag is then powered by the station and its unique identifier can then be sent to the station.

A human-machine dialog system is also described in the document US2009/128337. In this system, each key on a keyboard is associated with an electronic tag that comprises its own antenna. According to the position of the key, the tag is or is not located within the reading station dialog area. When a key is pressed, the electronic tag associated with this key approaches the station and can then be read by the station. When this key is released, its electronic tag exits from the station's field and can then no longer be read.

In the system described in the first prior art document, pressing a key therefore causes the connection of the tag to the antenna and in the system described in the second document, pressing the key enables the tag to enter the station dialog area. These two systems are therefore suitable for on-off button type human-machine dialog devices since the reading station can only read the tag's memory when the key is depressed. These modes of operation cannot be used for other types of human-machine dialog devices comprising, for example, signaling devices or more complex control devices with more than two positions.

A detection device comprising a circuit on which a controlled switch and an RFID tag are positioned in series is also known from the document US2008/007408. According to the state of the switch, the RFID tag sends a different message representative of the state of the switch.

Documents WO2008/038896 and US2009/167495 both describe an RFID type electronic tag comprising an LED controlled and powered via the tag's internal circuitry.

The object of the invention is to provide a human-machine dialog system in which the station can be associated with different types of human-machine dialog devices.

This object is achieved by a human-machine dialog system comprising:

- an RFID type read/write station notably including data processing means,
- an antenna magnetically connected or coupled with the read/write station,
- several human-machine dialog devices each comprising a human-machine dialog interface and an electronic tag,
- the electronic tag being equipped with an internal memory and processing means and being positioned so as to be powered via magnetic coupling by the read/write station and to be in contactless communication via magnetic coupling with the read/write station,
- the electronic tag's internal memory storing data representative of a state of the human-machine dialog device, and
- the station comprising read/write means for the electronic tag's internal memory,
- the system comprising a mounting support intended to accommodate each human-machine dialog device in a removable and interchangeable manner, providing the system with great modularity.

According to one feature, the human-machine dialog device comprises a control interface operable by a user and cooperating with the processing means of the electronic tag for writing data representative of the state of the human-machine dialog device in the electronic tag's memory.

According to another feature, the human-machine dialog device comprises a signaling interface connected to the tag so as to be able to be powered via the magnetic coupling existing between the station and the tag and cooperating with the processing means of the electronic tag for displaying the state corresponding to the data stored in the electronic tag's internal memory.

According to another feature, the human-machine dialog device comprises an identification or detection interface cooperating with the processing means of the electronic tag for writing data representative of the state of the human-machine dialog device in the electronic tag's memory.

According to another feature, the antenna is integrated into the mounting support.

According to another feature, the mounting support comprises a shielding arranged to limit the dialog area existing between the station and the electronic tags.

According to another feature, the mounting support and the station are positioned on each side of a wall.

According to a first variant embodiment, the mounting support comprises a plate intended to receive several human-machine dialog devices by sliding.

According to a second variant embodiment, the mounting support comprises a rod onto which the human-machine dialog devices are slipped. According to one feature, the antenna is, for example, integrated into the mounting support rod.

According to another feature of the invention, the system comprises an assembly including a wireless data transmitting/receiving device and an electronic tag, said assembly being capable of being positioned on the mounting support.

Figure 2:
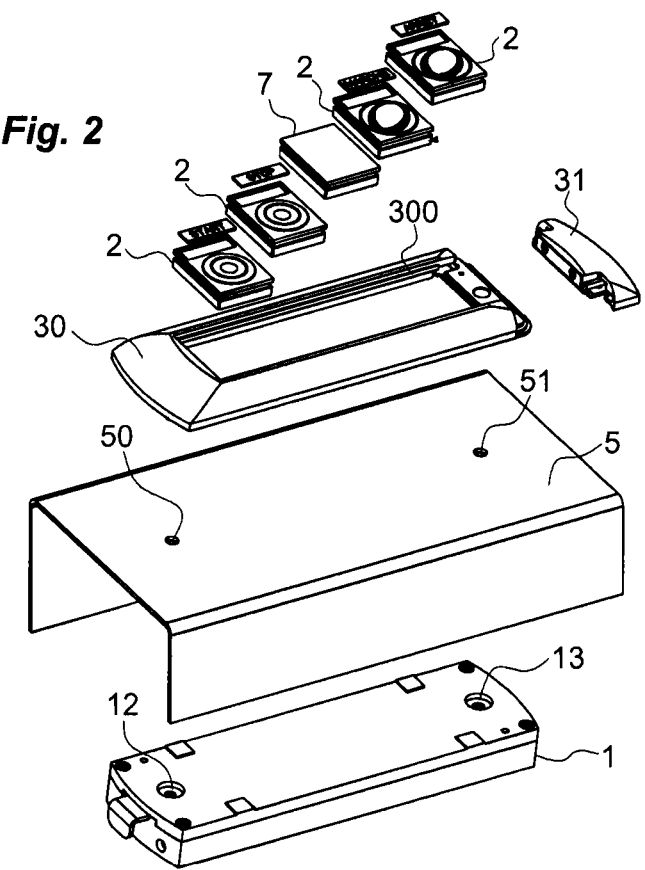
Figure 3A:
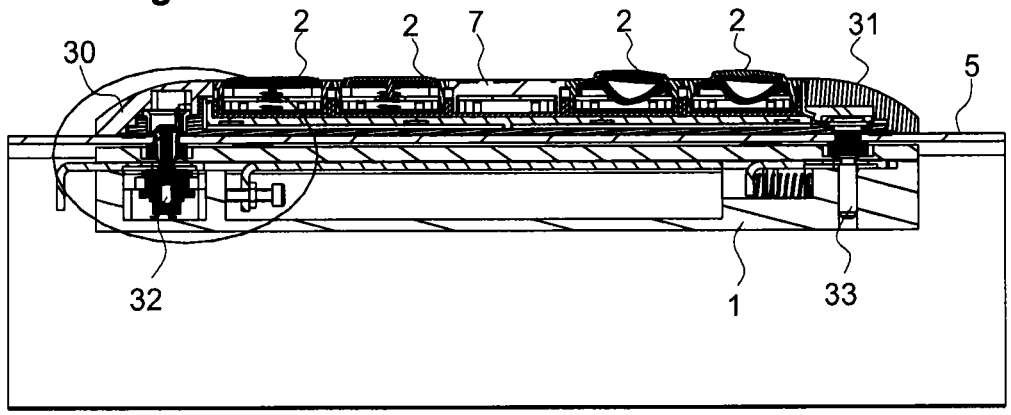
Figure 3B:
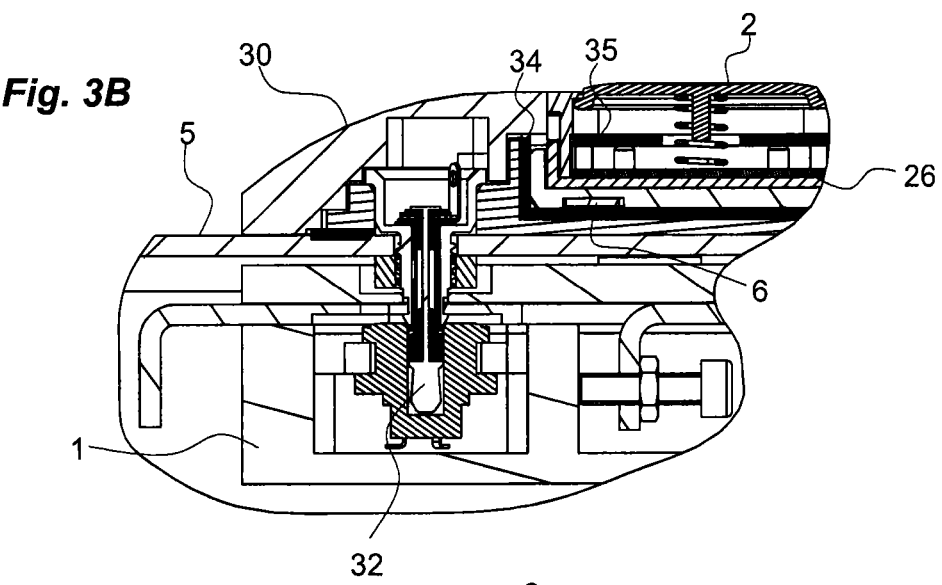
Figure 4:
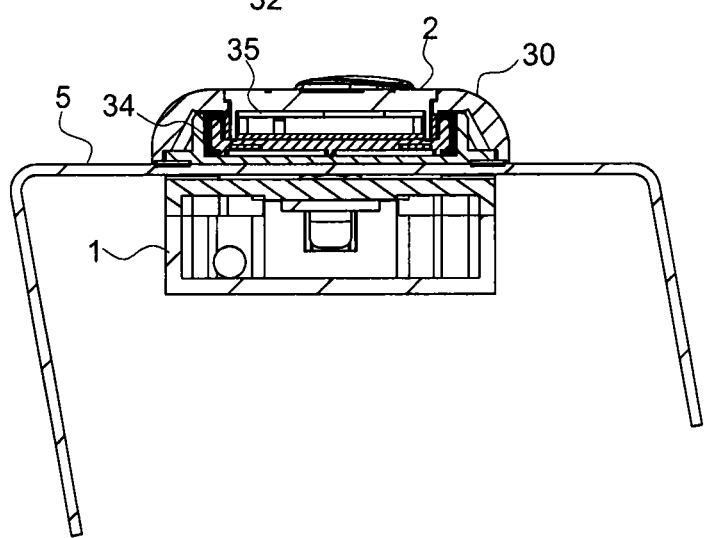
Figure 5:
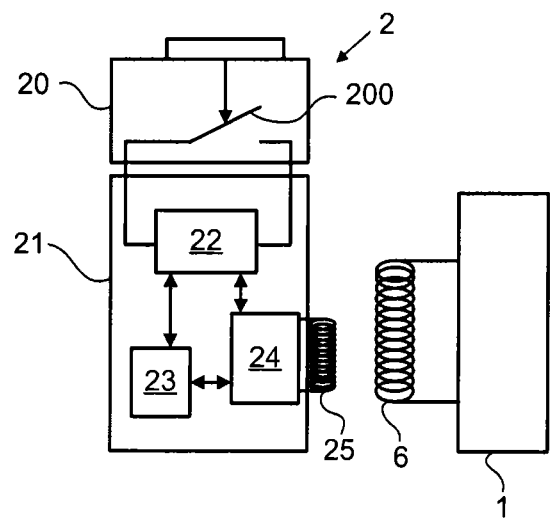
Figure 6:
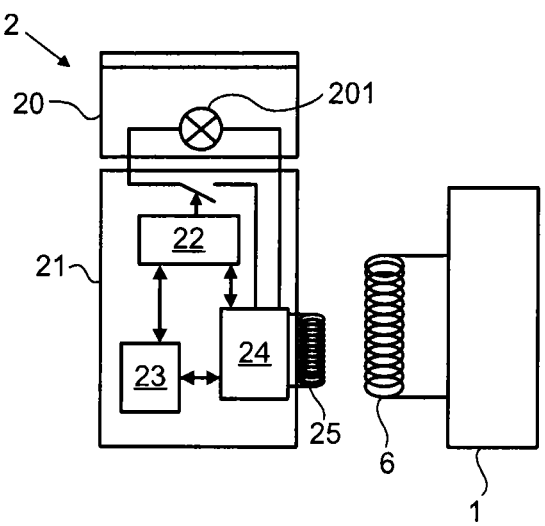
Figure 7:
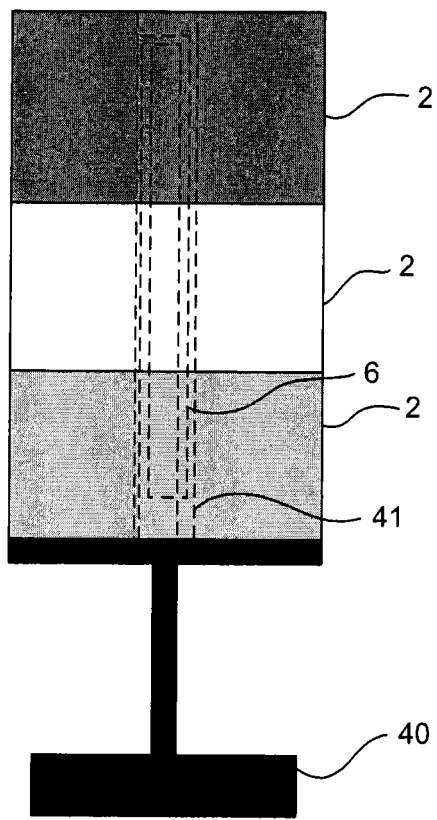

Other characteristics and advantages will appear in the following detailed description referring to an embodiment given by way of example and shown in the appended drawings in which:

FIG. 1 shows a perspective view of a human-machine dialog system according to the invention, FIG. 2 shows an exploded view of the human-machine dialog system in FIG. 1, FIG. 3A shows, in longitudinal axial section, the human-machine dialog system in FIG. 1, FIG. 3B shows a detail of FIG. 3A, FIG. 4 shows, in axial cross-section, the human-machine dialog system in FIG. 1, FIG. 5 shows schematically the operating architecture of a human-machine dialog device equipped with a push-button type control interface and an RFID type electronic tag, FIG. 6 shows schematically the operating architecture of a human-machine dialog device equipped with an indicator light and an RFID type electronic tag, FIG. 7 shows schematically a variant embodiment of a human-machine dialog system according to the invention, FIGS. 8A and 8B show schematically different operating configurations of the invention.

In the description that follows, for reasons of simplicity, some elements retain the same numerical reference in the different embodiments described.

The invention relates to a human-machine dialog system comprising notably an RFID type read/write station 1 and at least one human-machine dialog device 2 which comprises a human-machine dialog interface 20 and an RFID type electronic tag 21.

RFID type read/write station 1 is understood to mean a station capable of reading and possibly writing data into an RFID electronic tag 21 memory. In RFID technology, when an electronic tag 21 is within the field of action or dialog area of the station 1 and the station 1 transmits an electromagnetic signal, there is magnetic coupling between the tag 21 and the station 1, the antenna 6 of the station 1 and the antenna 25 of the tag being able to be considered as the primary and secondary of a transformer. The tag 21 responds to the signal transmitted by the station 1 and a dialog can be established, the information being exchanged by amplitude, frequency or phase modulation on the carrier frequency. The value of the transmission carrier frequency can be chosen in a so-called low frequency zone (e.g. 125 kHz) or preferably high frequency zone (e.g. 13.56 MHz). In both cases, the system operates in near field magnetic coupling, that is to say, usually with a range of the order of several centimeters to several tens of centimeters according to the energy available. In a known way, an antenna is formed by an inductance possibly associated with a resistance and a capacitor for matching the impedance of the antenna and tuning to the desired carrier frequency.

In the description that follows, human-machine dialog interface 20 is understood to mean any control interface that is manually operable or operable by an external element and operable directly or remotely via a wired or wireless connection. This therefore includes, for example, different types of button such as push-button, rotary knob with at least two positions, but also position sensors and other types of control interfaces such as touch screens.

Human-machine dialog interface 20 is also understood to mean any visual or sound signaling interface, whether coupled or not with a control interface. This therefore includes, for example, light indicators, illuminated tags or display screens, as well as all sound warning devices. According to the invention, the signaling interface used is powered by the energy captured by the antenna 25 of the tag 21 thanks to the magnetic coupling existing with the station 1.

Human-machine dialog interface 20 is also understood to mean any detection or identification interface whether or not coupled with a signaling interface or with a control interface as defined above. This therefore includes, for example, any presence sensor of a capacitive, inductive or resistive type as well as any biometric type sensor for identifying a person.

In the description that follows, it should be understood that the human-machine dialog device 2 may itself comprise several different human-machine dialog interfaces 20 as described above (see FIG. 1). Thus, the human-machine dialog device 2 may comprise both a control interface such as, for example, a push-button and a signaling interface such as, for example, a light indicator.

According to the invention, the human-machine dialog system may comprise, in addition to one or more human-machine dialog devices 2, an assembly 7 (FIGS. 1 and 2) comprising a data transmitting/receiving device using wireless technology (radio, infrared, etc.) and an RFID type electronic tag. In the description that follows, it should be understood that the human-machine dialog system of the invention may also integrate this type of assembly. This assembly may notably be associated on the system with one or more human-machine dialog devices 2 as described above.

According to the invention, each electronic tag 21 is associated with a human-machine dialog interface 20 as defined above. The two elements are, for example, combined in the same housing so as to form a one-piece assembly. The electronic components of each human-machine dialog device 2 are, for example, connected onto one and the same printed circuit 26 integrated into the device 2 housing (FIG. 3B).

In a known manner, each electronic tag has a unique identifier and comprises an antenna 25 consisting of an LC oscillating circuit and electronic circuitry including notably a memory 23 and data processing means 22 for interpreting the requests sent by the read/write station 1 and for sending the requested information. The electronic tag 21 is powered by the "carrier" transmitted from the station antenna as soon as it enters the range limits of said read/write station. The energy captured by the tag antenna 25 is converted into electrical energy, the latter being stored in energy storage means 24 for powering the internal electronic circuitry of the tag 21. The electronic tag 21 stores data, executes the orders from the read/write station 1 and transmits the requested data to the read/write station 1.

The memory 23 contained in the electronic tag 21 is, as a guide, a RAM, EEPROM or FERAM technology memory and notably stores data representative of the state of the human-machine dialog device 2 with which it is associated. The electronic tag's memory 23 can also store data relating to the type of human-machine dialog interface 20 with which the tag 21 is associated.

According to the invention, the unique identifier of each tag 21 is learned by the station 1 during a prior learning stage and is associated in the station memory with the type of human-machine dialog interface 20 corresponding to the tag 21. The station 1 then configures its inputs-outputs according to the type of human-machine dialog interface 20 to be addressed.

The configuration of the human-machine dialog device 2 may vary according to the type of human-machine dialog interface 20 used.

Thus, referring to FIG. 5, a push-button type human-machine dialog interface 20 comprises, for example, a contact 200 whose state is constantly monitored by the processing means 22 of the electronic tag 21. When the contact changes state, the processing means 22 of the electronic tag 21 write data representative of this state in its internal memory 23. The read/write station which scans the tag's 21 memory 23 at regular intervals can then be informed of the change of state of the human-machine dialog interface 20.

Referring to FIG. 6, an indicator light type human-machine dialog interface 20 comprises, for example, a light emitting diode 201 capable of being powered by the electronic tag 21. When the station 1 lights up the indicator, it writes into the tag's internal memory 23 data representative of the state that it wishes to give the light indicator, for example, data representative of the "lit" state of the indicator. The processing means 22 of the tag which read the memory 23 detect the change of state and order the actuation of a contact to connect the diode 201 to the means of energy storage 24 connected to the tag antenna 25. The indicator is then powered directly by the energy captured thanks to the tag 21 antenna 25.

Moreover, one of the principles of the invention consists in using an antenna 6a, 6b that is external to station 1. As shown in FIGS. 8A and 8B, the external antenna which is used can be connected directly to the read/write station (FIG. 8A) or magnetically coupled with the station (FIG. 8B). Patent FR2896898 describes more precisely the architecture of the antenna and different operating configurations.

According to the invention, the antenna 6 used has a specific shape enabling a sufficient coupling area for one or more electronic tags 21 located nearby. The shape of the coil used for the antenna 6 can equally be adapted to any of the different system configurations: these shapes can, for example, be substantially circular, elliptical, rectangular, and even have more complex profiles. In the appended figures, the antenna has been chosen with a generally rectangular and elongated shape so as to be capable of being magnetically coupled with several electronic tags positioned adjacently along the antenna.

In the first configuration shown in FIG. 8A, the antenna 6a is not directly integrated inside the station housing, but remotely located and connected to the station housing by an electrical cable.

In FIG. 8B, the antenna 6b is actually in the form of a passive antenna extender that is not electrically connected with the station or the tag but which is magnetically coupled with an antenna 10 integrated or connected with the station 1. In a known manner but not visible in the appended figures, this extender may comprise a first coil connected in series with a second coil. The first coil is, for example, of a different size from the second coil and is positioned near the station antenna, that is to say, in the field of action of the station, so as to create a magnetic coupling between the station antenna 10 and the first coil, when the station transmits an electromagnetic signal. Thus, when an RFID electronic tag is arranged near the second coil of the extender, i.e. in the field of action of the second coil, then there is magnetic coupling between the electronic tag antenna and the second coil. In this case, as the extender coils are connected in series, an electromagnetic signal transmitted by the antenna is propagated via magnetic coupling in the first coil, then circulates in the second coil before being propagated via magnetic coupling in the tag antenna. Similarly, an electromagnetic signal transmitted by the tag 21 antenna 25 will be received by the station antenna 6b, via the two coils.

Based on the different elements described above, the invention therefore consists of creating a human-machine dialog system using RFID technology between one or more human-machine dialog devices 2 and an RFID type read/write station 1. The invention applies notably to human-machine dialog systems that can be positioned on a cabinet door. The system of the invention can thus replace buttons or indicators each mounted individually on the cabinet door.

For this, in a first embodiment shown in FIGS. 1 to 4, the invention consists in dividing the human-machine dialog system into two separate parts. A first part consists of the RFID read/write station 1 and a second part consists of a mounting support 3 integrating the antenna 6 and capable of accommodating in a removable and interchangeable manner one or more human-machine dialog devices 2 compliant with those described above.

According to the invention, the station 1 and the mounting support 3 are therefore intended to be positioned on each side of a wall 5, such as, for example, the wall of an electrical cabinet. The station 1 will be arranged inside the cabinet, against a face of the wall 5 and the support will be arranged outside the cabinet on the opposite face of the wall 5. The configuration used between the station and the antenna being that of FIG. 8B, the support 3 is positioned on the face of the wall 5 so as to place the antenna 6 in magnetic coupling with the station 1 which is mounted on the opposite face of the wall 5. The station 1 and the mounting support 3 of the human-machine dialog devices 2 have, for example, mounting means cooperating with each other through the wall 5. Referring to FIGS. 3 and 4, the support 3 comprises, for example, two mounting devices, for example, two pins 32, 33. Each pin 32, 33 is intended to pass through an orifice 50, 51 made through the wall 5 and to be inserted at its free end in a complementary opening 12, 13 made on the station 1. According to the invention, only two orifices 50, 51 may therefore be necessary to mount the support 3 through the wall 5, the support 3 itself being able to accommodate several human-machine dialog devices 2. This configuration of the invention therefore notably displays the advantage of minimizing the number of orifices to be drilled through the wall 5.

In FIGS. 1 to 4, the mounting support 3 has, for example, the form of a plate 30. The plate comprises, for example, two parallel slide rails 300 on which it is possible to successively slip several human-machine dialog devices 2 as defined above. An element forming a plug 31 makes it possible to close the entrance of the plate 30 via which the human-machine dialog devices 2 are slipped on. In FIGS. 1 to 4, the support 3 can, for example, accommodate five human-machine dialog devices 2. The human-machine dialog devices 2 compatible with the support 3 all present a housing having an identical external shape, for example, parallelepipedal. They are distinguished from each other by their human-machine dialog interface(s) 20. Referring to FIGS. 1 to 4, they may, for example, comprise both a push-button type control interface and an illuminated tag type signaling interface.

The support 3 of the invention has the advantage of integrating the antenna 6 intended to produce the magnetic coupling between the human-machine dialog devices 2 located above and the station 1 located below. The support 3 comprises notably a shielding arranged to confine the magnetic field generated as much as possible thereby limiting the station dialog area. The shielding can therefore be used to limit the application of the magnetic field transmitted thanks to the antenna 6 to the human-machine dialog devices 2 positioned on the support 3. Referring to FIGS. 3A, 3B and 4, the shielding consists of at least one main screen-part 34 and secondary screen-parts 35 adapted to the carrier frequency. These screen-parts 34, 35 each consist, for example, of a magnetic conductive part wrapped in a layer of conductive material. The main screen-part 34 is integrated into the support 3 and extends along the support 3 beneath the antenna 6 while the secondary screen-parts 35 are each integrated into a human-machine dialog device 2 and arranged in each human-machine dialog device above the printed circuit 26.

A variant embodiment of the human-machine dialog system of the invention, shown in FIG. 7, consists in producing an illuminated column in which the support comprises, for example, a base 40 in which the station is housed and a rod 41 onto which human-machine dialog devices 2 are slipped, each having a light signaling device type human-machine dialog interface. The antenna 6 is, for example, connected directly to the station according to the configuration shown in FIG. 8A and is housed in the rod 41 of the support, along the latter so as to be able to ensure the magnetic coupling between each human-machine dialog device 2 and the station 1. Thanks to this variant, it is possible to easily replace a column signaling device without any special wiring operation.

The system of the invention therefore has a number of advantages some of which are listed below:
- Reduction in the number of holes to be drilled through the wall,
- Possibility of configuring the system, even after mounting the support,
- Possibility of modifying the system at any time by removing, adding or exchanging human-machine dialog devices,
- Limiting the wiring since it is no longer necessary to wire each human-machine dialog device individually,
- Possibility of integrating the system into a network by directly connecting the station onto the network,
- Modularity of the system and wealth of functions provided, etc.

The invention claimed is:

1. A human-machine dialog system comprising:
a read/write station including data processing circuitry;
an antenna magnetically connected or coupled with the read/write station;
plural human-machine dialog devices each comprising a human-machine dialog interface and an electronic tag, the electronic tag including an internal memory and processing circuitry and being positioned so as to be powered via magnetic coupling by the read/write station and to be in contactless communication via magnetic coupling with the read/write station, the electronic tag's internal memory stores data representative of a state of a corresponding human-machine dialog device, and the read/write station comprises read/write circuitry to read from and write to the electronic tag's internal memory; and
a mounting support configured to accommodate each of the plural human-machine dialog devices in a removable and interchangeable manner,
wherein the mounting support comprises a plate including parallel slide rails that are configured to receive the plural human-machine dialog devices by sliding.

2. The system as claimed in claim 1, wherein each of the plural human-machine dialog devices comprise a control interface operable by a user and cooperating with a corresponding processing circuitry of a corresponding electronic tag for writing data representative of a state of the corresponding human-machine dialog device in a corresponding electronic tag's internal memory.

3. The system as claimed in claim 1, wherein each of the plural human-machine dialog devices comprise a signaling interface connected to a corresponding electronic tag so as to be able to be powered via the magnetic coupling existing between the read/write station and the corresponding electronic tag and cooperating with a corresponding processing circuitry of the corresponding electronic tag to display a state corresponding to data stored in a corresponding electronic tag's internal memory.

4. The system as claimed in claim 1, wherein each of the plural human-machine dialog devices comprise an identification or detection interface cooperating with a corresponding processing circuitry of a corresponding electronic tag to write data representative of the state of the corresponding human-machine dialog device in a corresponding electronic tag's internal memory.

5. The system as claimed in claim 1, wherein the antenna is integrated into the mounting support.

6. The system as claimed in claim 5, wherein the mounting support comprises a shielding arranged to limit a dialog area existing between the read/write station and electronic tags.

7. The system as claimed in claim 1, wherein the mounting support and the read/write station are positioned on each side of a wall.

8. The system as claimed in claim 1, wherein the human-machine dialog system comprises an assembly including a wireless data transmitting/receiving device and an other electronic tag, the assembly being configured to be positioned on the mounting support.

9. The system as claimed in claim 1, wherein the plural human-machine dialog devices are identically shaped.

10. The system as claimed in claim 1, wherein the mounting support includes a plug to open and close an entrance of the plate via which the plural human-machine dialog devices are slid.

11. The system as claimed in claim 10, wherein the plug is included only on one side of the mounting support.

12. The system as claimed in claim 1, wherein the mounting support includes two mounting pins to allow the mounting support to attach to a wall.

13. A human-machine dialog system comprising:
a read/write station including data processing circuitry;
an antenna magnetically connected or coupled with the read/write station;
plural human-machine dialog devices each comprising a human-machine dialog interface and an electronic tag, the electronic tag including an internal memory and processing circuitry and being positioned so as to be powered via magnetic coupling by the read/write station and to be in contactless communication via magnetic coupling with the read/write station, the electronic tag's internal memory stores data representative of a state of a corresponding human-machine dialog device, and the read/write station comprises read/write circuitry to read from and write to the electronic tag's internal memory; and
a mounting support configured to accommodate each of the plural human-machine dialog devices in a removable and interchangeable manner,
wherein the mounting support comprises a rod on which the human-machine dialog devices are slipped.

* * * * *